US007693715B2

(12) United States Patent
Hwang et al.

(10) Patent No.: US 7,693,715 B2

(45) Date of Patent: Apr. 6, 2010

(54) GENERATING LARGE UNITS OF GRAPHONEMES WITH MUTUAL INFORMATION CRITERION FOR LETTER TO SOUND CONVERSION

(75) Inventors: Mei-Yuh Hwang, Sammamish, WA (US); Li Jiang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1669 days.

(21) Appl. No.: 10/797,358

(22) Filed: Mar. 10, 2004

(65) Prior Publication Data

US 2005/0203739 A1 Sep. 15, 2005

(51) Int. Cl.
*G10L 15/04* (2006.01)

(52) U.S. Cl. ..................................................... 704/254

(58) Field of Classification Search ................. 704/251, 704/254

See application file for complete search history.

(56) References Cited

U.S. PATENT DOCUMENTS 6,067,520 A * 5/2000 Lee ............................ 704/270
6,185,524 B1 * 2/2001 Carus et al. ..................... 704/9
6,505,151 B1 * 1/2003 Chou et al. ..................... 704/9
2001/0009009 A1 * 7/2001 Iizuka ........................ 707/539
2002/0082831 A1 6/2002 Hwang et al. ............... 704/249
2003/0049588 A1 * 3/2003 Lawrence ................... 434/167
2003/0088416 A1 * 5/2003 Griniasty .................... 704/256
2005/0182629 A1 * 8/2005 Coorman et al. ............ 704/266
2005/0256715 A1 * 11/2005 Okimoto et al. ............. 704/257

OTHER PUBLICATIONS

U.S. Appl. No. 10/761,451, filed Jan. 20, 2004.
Ph. D. thesis, MIT, Jun. 2002, "Modelling Out-of-Vocabulary Words for Robust Speech Recognition," by Issam Bassi, pp. 84-87.
M. McCandless, "Empirical Acquisition of Language Models for Speech Recognition," International Conference on Spoken Language Processing, 1994.
I. Bazzi and J. Glass, "Learning Units for Domain-Independent Out-of-Vocabulary Word Modeling," in Proc. European Conf. on Speech Communication and Technology, Aalborg, Sep. 2001, pp. 61-64.

(Continued)

*Primary Examiner*—David R Hudspeth
*Assistant Examiner*—Jakieda R Jackson
(74) *Attorney, Agent, or Firm*—Theodore M. Magee; Westman, Champlin & Kelly, P.A.

(57) ABSTRACT

A method and apparatus are provided for segmenting words into component parts. Under the invention, mutual information scores for pairs of graphoneme units found in a set of words are determined. Each graphoneme unit includes at least one letter. The graphoneme units of one pair of graphoneme units are combined based on the mutual information score. This forms a new graphoneme unit. Under one aspect of the invention, a syllable n-gram model is trained based on words that have been segmented into syllables using mutual information. The syllable n-gram model is used to segment a phonetic representation of a new word into syllables. Similarly, an inventory of morphemes is formed using mutual information and a morpheme n-gram is trained that can be used to segment a new word into a sequence of morphemes.

17 Claims, 4 Drawing Sheets

OTHER PUBLICATIONS

I. Bazzi and J. Glass, "Modeling Out-of-Vocabulary Words for Speech Recognition," Proc. ICSLP, 401-404, Beijing, China, 2000.

M. Bisani and H. Ney, "Investigations on Joint-Multigram Models for Grapheme-to-Phoneme Conversion," Proc. ICLSP 2002, vol. 1, pp. 105-108, Denver.

S. Chen, "Conditional and Joint Models for Grapheme-to-Phoneme Conversion," EUROSPEECH 2003, Geneva, pp. 2033-2036.

P. Vozila, J. Adams, Y. Lobacheva, and R. Thomas, "Grapheme to Phoneme Conversion and Dictionary Verification Using Graphonemes," EUROSPEECH 2003, Geneva, pp. 2469-2472.

Notice on First Office Action dated Jun. 12, 2009 for corresponding Application No. 200510052754.2 filed on Mar. 10, 2005.

Examination Report from corresponding German Patent Application 05 101 790.3, filed Mar. 8, 2005.

* cited by examiner

GENERATING LARGE UNITS OF GRAPHONEMES WITH MUTUAL INFORMATION CRITERION FOR LETTER TO SOUND CONVERSION

BACKGROUND OF THE INVENTION

The present invention relates to letter-to-sound conversion systems. In particular, the present invention relates to generating graphonemes used in letter-to-sound conversion.

In letter-to-sound conversion, a sequence of letters is converted into a sequence of phones that represent the pronunciation of the sequence of letters.

In recent years, an n-gram based system has been used for letter-to-speech conversion. The n-gram system utilizes "graphonemes" which are joint units representing both letters and the phonetic pronunciation of those letters. In each graphoneme, there can be zero or more letters in the letter part of the graphoneme and zero or more phones in the phoneme part of the graphoneme. In general, the graphoneme is denoted as l*:p*, where l* means zero or more letters and p* means zero or more phones. For example, "tion:sh&ax&n" represents a graphoneme unit with four letters (tion) and three phones (sh, ax, n). The delimiter "&" is added between phones because phone names can be longer than one character.

The graphoneme n-gram model is trained based on a dictionary that has spelling entries for words and phoneme pronunciations for each word. This dictionary is called the training dictionary. If the letter to phone mapping in the training dictionary is given, the training dictionary can be converted into a dictionary of graphoneme pronunciations. For example, assume phone ph:f o:ow n:n e:# is given somehow. The graphoneme definitions for each word are then used to estimate the likelihood of sequences of "n" graphonemes. For example, in a graphoneme trigram, the probability of sequences of three graphonemes, $Pr(g_3|g_1g_2)$, are estimated from the training dictionary with graphoneme pronunciations.

Under many systems of the prior art that use graphonemes, when a new word is provided to the letter-to-sound conversion system, a best first search algorithm is used to find the best or n-best pronunciations based on the n-gram scores. To perform this search, one begins with a root node that contains the beginning symbol of the graphoneme n-gram model, typically denoted by <s>. <s> indicates the beginning of a sequence of graphonemes. The score (log probability) associated with the root node is log(Pr(<s>)=1)=0. In addition, each node in the search tree keeps track of the letter location in the input word. Let's call it the "input position". The input position of <s> is 0 since no letter in the input word is used yet. To sum up, a node in the search tree contains the following information for the best-first search:

```
struct node {
    int score, input_position;
    node *parent;
    int graphoneme_id;
};
```

Meanwhile a heap structure is maintained in which the highest scoring of search nodes is found at the top of the heap. Initially there is only one element in the heap. This element points to the root node of the search tree. At any iteration of the search, the top element of the heap is removed, which gives us the best node so far in the search tree. One then extends child nodes from this best node by looking up the graphoneme inventory those graphonemes whose letter parts are a prefix of the left-over letters in the input word starting from the input position of the best node. Each such graphoneme generates a child node of the current best node. The score of a child node is the score of the parent node (i.e. the current best node), plus the n-gram graphoneme score to the child node. The input position of the child node is advanced to be the input position of the parent node plus the length of the letter part of the associated graphoneme in the child node. Finally the child node is inserted into the heap.

Special attention has to be paid when all the input letters are consumed. If the input position of the current best node has reached the end of the input word, a transition to the end symbol of the n-gram model, </s>, is added to the search tree and the heap.

If the best node removed from the heap contains </s> as its graphoneme id, a phonetic pronunciation corresponding to the complete spelling of the input word has been obtained. To identify the pronunciation, the path from the last best node </s> all the way back to the root node <s> is traced and the phoneme parts of the graphoneme units along that path are output.

The first best node with </s> is the best pronunciation according to the graphoneme n-gram model, as the rest of the search nodes have scores that are worse than this score already and future paths to </s> from any of the rest of search nodes are going to make the scores only worse (because log(probability) <0). If elements continue to be removed from the heap, the $2^{nd}$ best, $3^{rd}$ best, etc. pronunciations can be identified until either there are no more elements in the heap or the n-th best pronunciation is worse than the top 1 pronunciation by a threshold. The n-best search then stops.

There are several ways to train the n-gram graphoneme model, such as maximum likelihood, maximum entropy, etc. The graphonemes themselves can also be generated in different ways. For example, some prior art uses hidden Markov models to generate initial alignments between letters and phonemes of the training dictionary, followed by merging of frequent pairs of these l:p graphonemes into larger graphoneme units. Alternatively a graphoneme inventory can also be generated by a linguist who associates certain letter sequences with particular phone sequences. This takes a considerable amount of time and is error-prone and somewhat arbitrary because the linguist does not use a rigorous technique when grouping letters and phones into graphonemes.

SUMMARY OF THE INVENTION

A method and apparatus are provided for segmenting words and phonetic pronunciations into sequence of graphonemes. Under the invention, mutual information for pairs of smaller graphoneme units is determined. Each graphoneme unit includes at least one letter. At each iteration, the best pair with maximum mutual information is combined to form a new longer graphoneme unit. When the merge algorithm stops, a dictionary of words is obtained where each word is segmented into a sequence of graphonemes in the final set of graphoneme units.

With the same mutual-information based greedy algorithm but without the letters being considered, phonetic pronunciations can be segmented into syllable pronunciations. Similarly, words can also be broken into morphemes by assigning the "pronunciation" of a word to be the spelling and again ignoring the letter part of a graphoneme unit.

DETAILED DESCRIPTION OF ILLUSTRATIVE EMBODIMENTS

Figure 1:
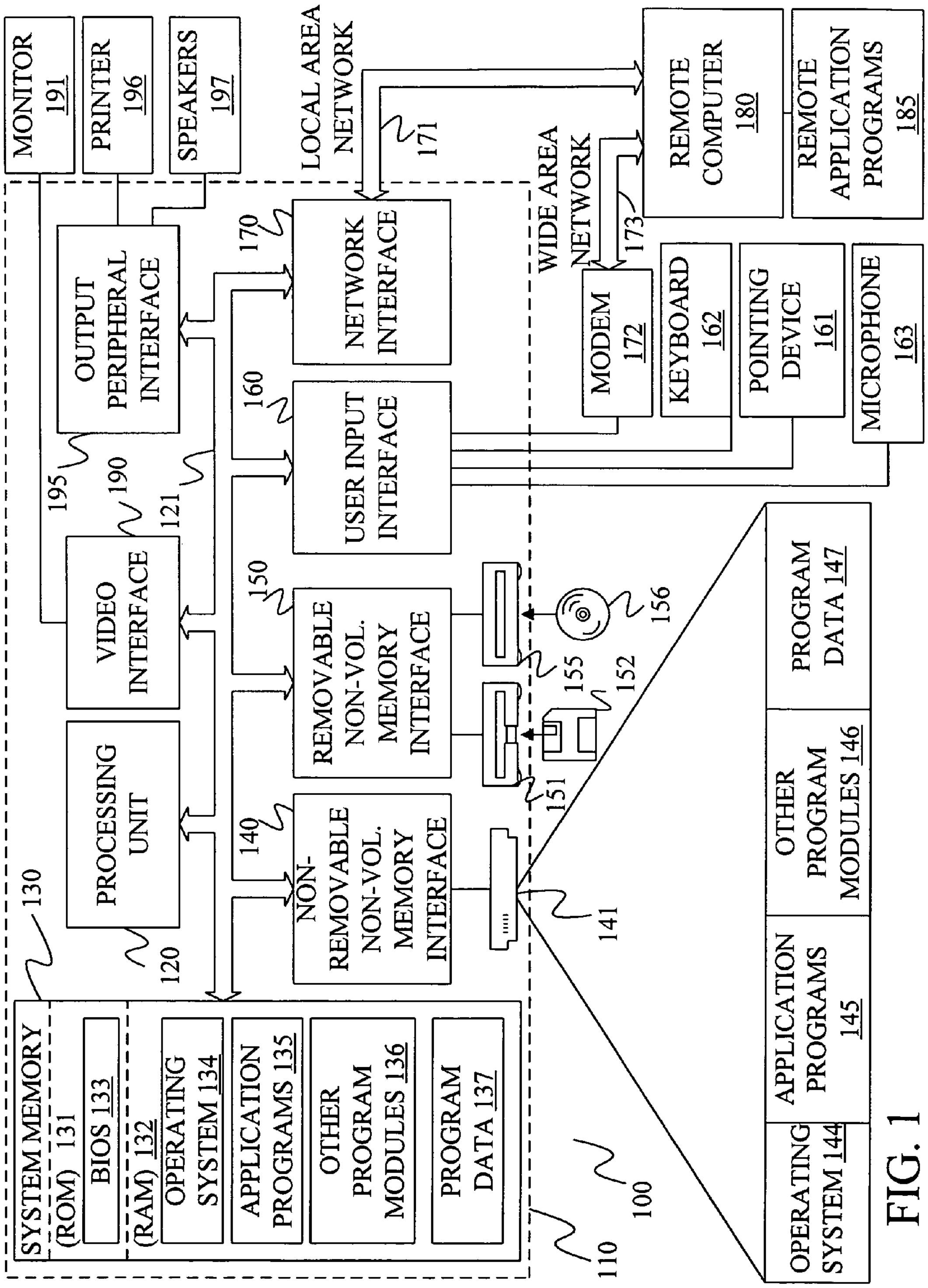
FIG. 1 is a block diagram of a general computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
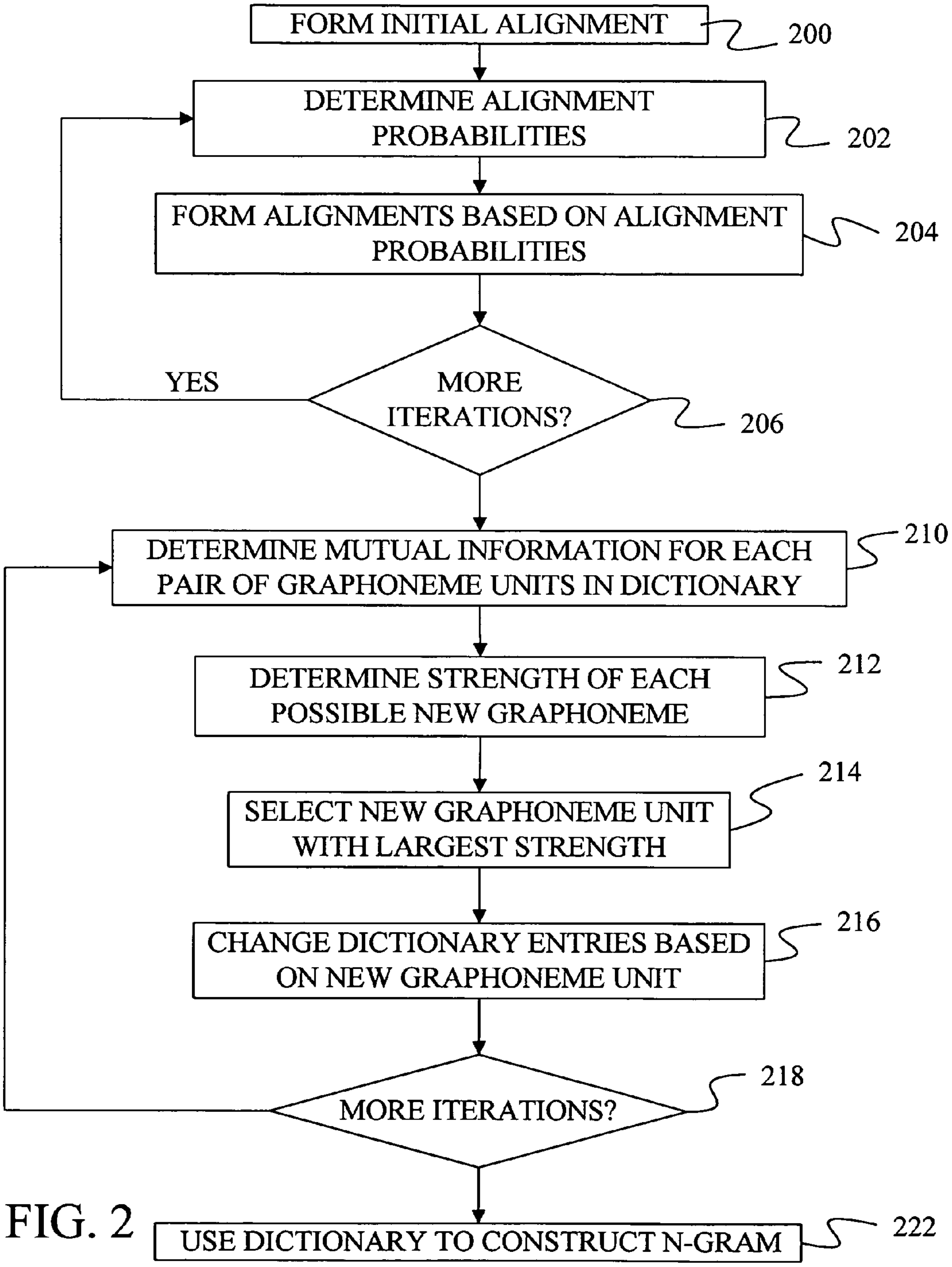
FIG. 2 is a flow diagram of a method for generating large units of graphonemes under one embodiment of the present invention.

Under one embodiment of the present invention, graphonemes that can be used in letter-to-sound conversion are formed using mutual information criterion. FIG. 2 provides a flow diagram for forming such graphonemes under one embodiment of the present invention.

In step 200 of FIG. 2, words in a dictionary are broken into individual letters and each of the individual letters is aligned with a single phone in a phone sequence associated with the word. Under one embodiment, this alignment proceeds from left to right through the word so that the first letter is aligned with the first phone, and the second letter is aligned with the second phone, etc. If there are more letters than phones, then the rest of the letters map to silence, which is indicated by "#". If there are more phones than letters, then the last letter maps to multiple phones. For example, the words "phone" and "box" are mapped as follows initially:

phone: p:f h:ow o:n n:# e:# box: b:d o:aa x:k&s

Thus, each initial graphoneme unit has exactly one letter and zero or more phones. These initial units can be denoted generically as l:p*.

After the initial alignment, the method of FIG. 2 determines alignment probabilities for each letter at step 202. The alignment probabilities can be calculated as:

$$p(p^* \mid l) = \frac{c(p^* \mid l)}{\sum_{s^*} c(s^* \mid l)} \qquad \text{Eq. 1}$$

Where p(p*|l) is the probability of phone sequence p* being aligned with letter l, c(p* |l) is the count of the number of times that the phone sequence p* was aligned with the letter l in the dictionary, and c(s* |l) is the count for the number of times the phone sequence s* was aligned with the letter l, where the summation in the denominator is taken across all possible phone sequences as s* that are aligned with letter l in the dictionary.

After the alignment probabilities have been determined, new alignments are formed at step 204, again assigning one letter per graphoneme with zero or more phones associated with each graphoneme. This new alignment is based on the alignment probabilities determined in step 202. In one particular embodiment, a Viterbi decoding system is used in which a path through a Viterbi trellis, such as the example trellis of FIG. 3, is identified from the alignment probabilities.

Figure 3:
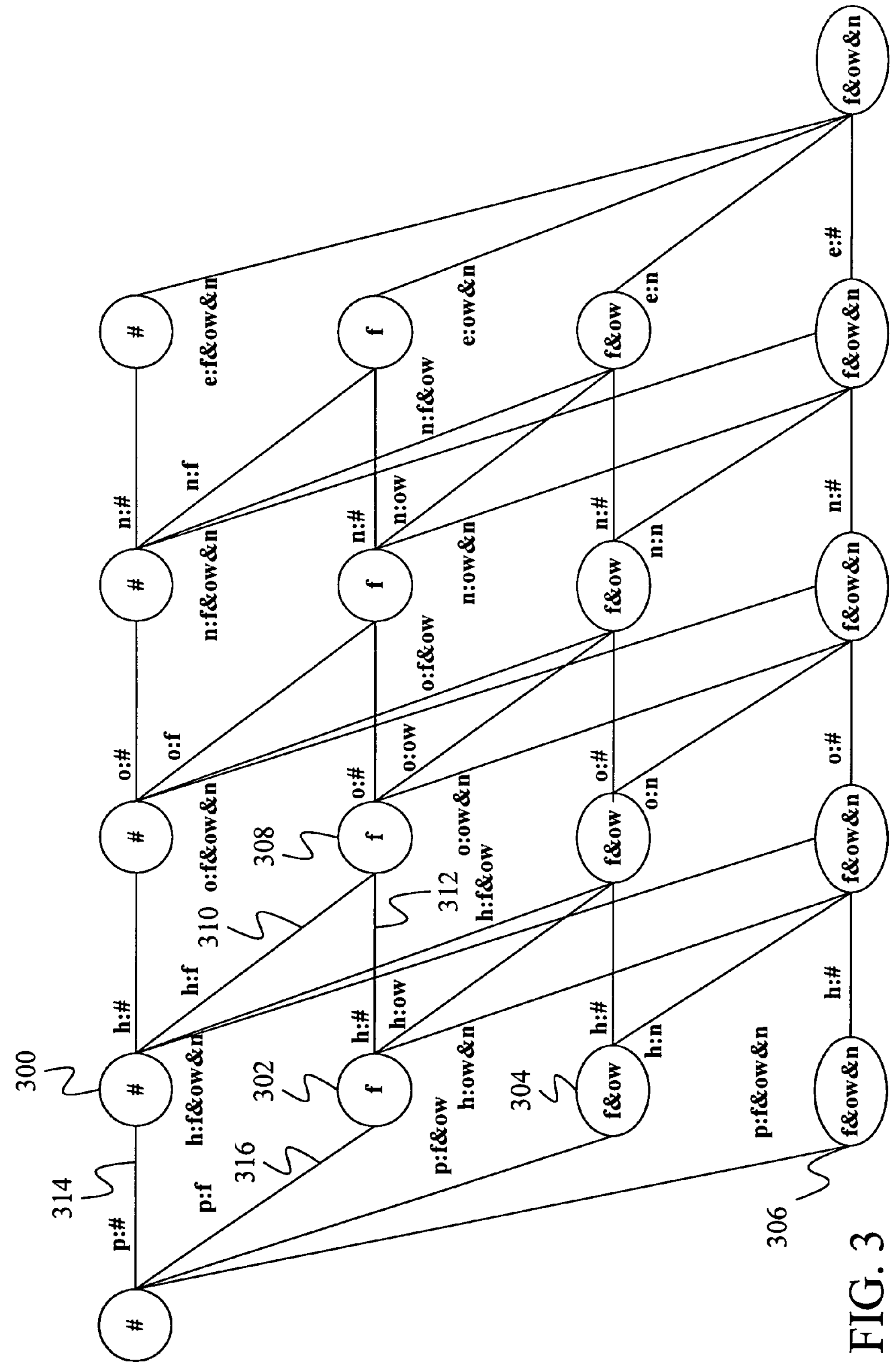
FIG. 3 is an example decoding trellis for segmenting the word "phone" into sequences of graphonemes.

The trellis of FIG. 3 is for the word "phone" which has the phonetic sequence f&ow&n. The trellis includes a separate state index for each letter and an initial silence state index. At each state index, there is a separate state for the progress through the phone sequence. For example, for the state index for the letter "p", there is a silence state 300, an /f/ state 302, an /f&ow/ state 304 and an /f&ow&n/ state 306. Each transition between two states represents a possible graphoneme.

For each state at each state index, a single path into the state is selected by determining the probability for each complete path leading to the state. For example, for state 308, Viterbi decoding selects either path 310 or path 312. The score for path 310 includes the probability of the alignment p:# of path 314 and the probability of the alignment h:f of path 310. Similarly, the score for path 312 includes the probability of the alignment p:f of path 316 and the alignment of h:# of path 312. The path into each state with the highest probability is selected and the other path is pruned from further consideration. Through this decoding process, each word in the dictionary is segmented into a sequence of graphonemes. For example, in FIG. 3, the graphoneme sequence:

p:f h:# o:ow n:n e:# may be selected as being the most probable alignment.

At step 206, the method of the present invention determines if more alignment iterations should be performed. If more alignment iterations are to be performed, the process returns to step 202 to determine the alignment probabilities based on the new alignments formed at step 204. Steps 202, 204 and 206 are repeated until the desired number of iterations has been performed.

The iterations of steps 202, 204 and 206 result in a segmentation of each word in the dictionary into a sequence of graphoneme units. Each grapheme unit contains exactly one letter in the spelling part and zero or more phonemes in the phone part.

At step 210, a mutual information is determined for each consecutive pair of the graphoneme units found in the dictionary after alignment step 204. Under one embodiment, the mutual information of two consecutive graphoneme units is computed as:

$$MI(u_1, u_2) = Pr(u_1, u_2)\log\frac{Pr(u_1, u_2)}{Pr(u_1)Pr(u_2)} \quad \text{Eq. 2}$$

where $MI(u_1,u_2)$ is the mutual information for the pair of graphoneme units $u_1$ and $u_2$. $Pr(u_1,u_2)$ is the joint probability of graphoneme unit $u_2$ appearing immediately after graphoneme unit $u_1$. $Pr(u_1)$ is the unigram probability of graphoneme unit $u_1$ and $Pr(u_2)$ is the unigram probability of graphoneme unit $u_2$. The probabilities of Equation 2 are calculated as:

$$Pr(u_1) = \frac{\text{count}(u_1)}{\text{count}(*)} \quad \text{Eq. 3}$$

$$Pr(u_2) = \frac{\text{count}(u_2)}{\text{count}(*)} \quad \text{Eq. 4}$$

$$Pr(u_1u_2) = \frac{\text{count}(u_1u_2)}{\text{count}(*)} \quad \text{Eq. 5}$$

where $\text{count}(u_1)$ is the number of times graphoneme unit $u_1$ appears in the dictionary, $\text{count}(u_2)$ is the number of times graphoneme unit $u_2$ appears in the dictionary, $\text{count}(u_1u_2)$ is the number of times graphoneme unit $u_2$ follows immediately after graphoneme unit $u_1$ in the dictionary and count(*) is the number of instances of all graphoneme units in the dictionary.

Strictly speaking, Equation 2 is not the mutual information between two distributions and therefore is not guaranteed to be non-negative. However, its formula resembles the mutual information formula and thus has been mistakenly named mutual information in the literature. Therefore, within the context of this application, we will continue to call the computation of Equation 2 a mutual information computation.

After the mutual information has been computed for each pair of neighboring graphoneme units in the dictionary at step 210, the strength of each new possible graphoneme unit $u_3$ is determined at step 212. A new possible graphoneme unit results from the merging of two existing smaller graphoneme units. However, two different pairs of graphoneme units can result in the same new graphoneme unit. For example, graphoneme pair (p:f, h:#) and graphoneme pair (p:#, h:f) both form the same larger graphoneme unit (ph:f) when they are merged together. Therefore, we define the strength of a new possible graphoneme unit $u_3$ to be the summation of all the mutual information formed by merging different pairs of graphoneme units that result in the same new unit $u_3$:

$$\text{strength}(u_3) = \sum_{\forall u_1 u_2 = u_3} MI(u_1, u_2) \quad \text{Eq. 6}$$

where $\text{strength}(u_3)$ is the strength of the possible new unit $u_3$, and $u_1u_2=u_3$ means merging $u_1$ and $u_2$ will result in $u_3$. Therefore the summation of Equation 6 is done over all such pair units $u_1$ and $u_2$ that create $u_3$.

At step 214 the new unit with the largest strength is created. The dictionary entries that include the constituent pairs that form the selected new unit are then updated by substituting the pair of the smaller units with the newly formed unit.

At step 218, the method determines if more larger graphoneme units should be created. If so, the process returns to step 210 and recalculates the mutual information for pairs of graphoneme units. Notice some old units may now not be needed by the dictionary anymore (i.e., $\text{count}(u_1)=0$) after the previous merge. Steps 210, 212, 214, 216, and 218 are repeated until a large enough set of graphoneme units has been constructed. The dictionary is now segmented into graphoneme pronunciations.

The segmented dictionary is then used to train a graphoneme n-gram at step 222. Methods for constructing an n-gram can include maximum entropy based training as well as maximum likelihood based training, among others. Those skilled in the art of building n-grams understand that any suitable method of building an n-gram language model can be used with the present invention.

By using mutual information to construct the larger graphoneme units, the present invention provides an automatic technique for generating large graphoneme units for any spelling language and requires no work from a linguist in identifying the graphoneme units manually.

Once the graphoneme n-gram is produced in step 222 of FIG. 2, we can then use the graphoneme inventory and n-gram to derive pronunciations of a given spelling. They can also be used to segment a spelling with its phonetic pronunciation into a sequence of graphonemes in an inventory. This is achieved by applying a forced alignment that requires a prefix matching between the letters and phones of graphonemes with the left-over letters and phones of each node in the search tree. The sequence of graphonemes that provides the highest probability under the n-gram and that matches both the letters and the phones is then identified as the graphoneme segmentation of the given spelling/pronunciation.

Figure 4:
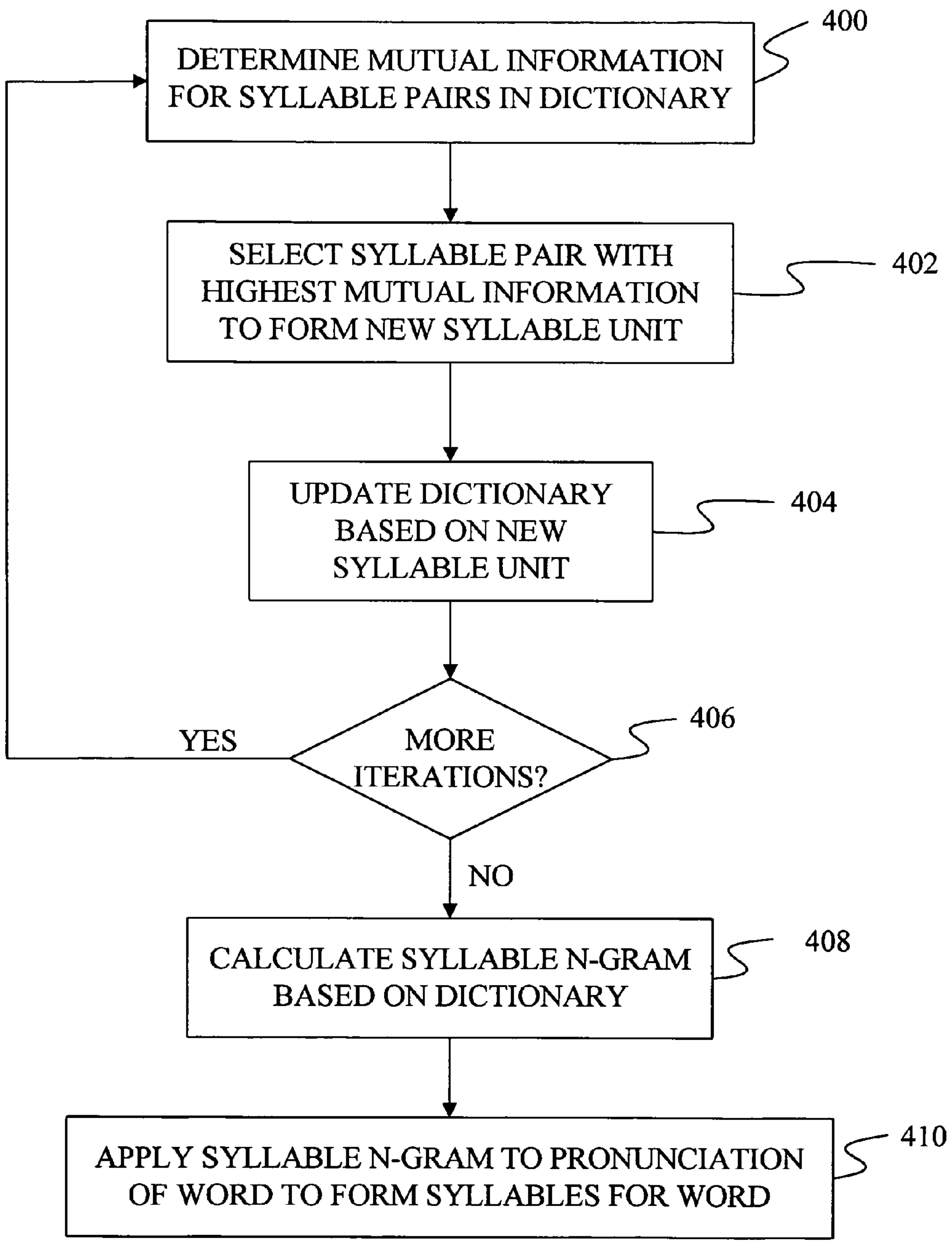
FIG. 4 is a flow diagram of a method of training and using a syllable n-gram based on mutual information.

With the same algorithm, one can also segment phonetic pronunciations into syllabic pronunciations by generating a syllable inventory, training a syllable n-gram and then performing a forced alignment on the pronunciation of the word. FIG. 4 provides a flow diagram of a method for generating and using a syllable n-gram to identify syllables for a word. Under one embodiment, graphonemes are used as the input to the algorithm, even though the algorithm ignores the letter side of each graphoneme and only uses the phones of each graphoneme.

In step 400 of FIG. 4, a mutual information score is determined for each phone pair in the dictionary. At step 402, the phone pair with the highest mutual information score is selected and a new "syllable" unit comprising the two phones is generated. At step 404 dictionary entries that include the phone pair are updated so that the phone pair is treated as a single syllable unit within the dictionary entry.

At step 406, the method determines if there are more iterations to perform. If there are more iterations, the process returns to step 400 and a mutual information score is generated for each phone pair in the dictionary. Steps 400, 402, 404 and 406 are repeated until a suitable set of syllable units have been formed.

At step 408, the dictionary, which has now been divided into syllable units, is used to generate a syllable n-gram. The syllable n-gram model provides the probability of sequences of syllables as found in the dictionary. At step 410, the syllable n-gram is used to identify the syllables of a new word given the pronunciation of the new word. In particular, a forced alignment is used wherein the phones of the pronunciation are grouped into the most likely sequence of syllable units based on the syllable n-gram. The result of step 410 is a grouping of the phones of the word into syllable units.

This same algorithm may be used to break words into morphemes. Instead of using the phones of a word, the individual letters of the words are used as the word's "pronunciation" . To use the greedy algorithm described above directly, the individual letters are used in place of the phones in the graphonemes and the letter side of each graphoneme is ignored. So at step 400, the mutual information for pairs of letters in the training dictionary is identified and the pair with the highest mutual information is selected at step 402. A new morpheme unit is then formed for this pair. At step 404, the dictionary entries are updated with the new morpheme unit. When a suitable number of morpheme units has been created, the morpheme units found in the dictionary are used to train an n-gram morpheme model that can later be used to identify morphemes for a word from the word's spelling with the above forced alignment algorithm. Using this technique, a word such as "transition" may be divided into morpheme units of "tran si tion".

Although the present invention has been described with reference to particular embodiments, workers skilled in the art will recognize that changes may be made in form and detail without departing from the spirit and scope of the invention.

What is claimed is:

1. A method of segmenting words into component parts, the method comprising:

a processor determining a mutual information score for a pair of graphoneme units, comprising a first graphoneme unit and a second graphoneme unit, using the probability of the first graphoneme unit appearing immediately after the second graphoneme unit, the unigram probability of the first graphoneme unit and the unigram probability of the second graphoneme unit, each graphoneme unit comprising at least one letter in the spelling of a word;

a processor using the mutual information score to combine the first and second graphoneme units into a larger graphoneme unit; and in a dictionary comprising segmentations of words into sequences of graphoneme units, a processor replacing the first and second graphoneme units with the larger graphoneme unit in each sequence of graphoneme units in which the first graphoneme unit appears immediately after the second graphoneme unit.

2. The method of claim 1 wherein combining graphoneme units comprises combining the letters of each graphoneme unit to produce a sequence of letters for the larger graphoneme unit and combining phones of each graphoneme unit to produce a sequence of phones for the larger graphoneme unit.

3. The method of claim 1 further comprising using the segmented words to generate a model.

4. The method of claim 3 wherein the model describes the probability of a graphoneme unit given a context within a word.

5. The method of claim 4 further comprising using the model to determine a pronunciation of a word given the spelling of the word.

6. The method of claim 1 wherein using the mutual information score comprises summing at least two mutual information scores determined for a single larger graphoneme unit to form a strength.

7. A computer-readable storage medium having computer-executable instructions stored thereon that when executed by a processor cause the processor to perform steps comprising:

determining mutual information scores for pairs of graphoneme units found in a set of words, each graphoneme unit comprising at least one letter and each mutual information score for a pair of graphoneme units based on the probability of one graphoneme unit of the pair of graphoneme units appearing immediately after the other graphoneme unit of the pair of graphoneme units, and the unigram probabilities of each graphoneme unit in the pair of graphoneme units;

combining the graphoneme units of one pair of graphoneme units to form a new graphoneme unit based on the mutual information scores; and updating a segmentation of a word comprising a set of graphoneme units for the word that includes the pair of graphoneme units by replacing the pair of graphoneme units in the segmentation with the new graphoneme unit.

8. The computer-readable storage medium of claim 7 wherein combining the graphoneme units comprises combining the letters of the graphoneme units to form a sequence of letters for the new graphoneme unit.

9. The computer-readable storage medium of claim 8 wherein combining the graphoneme units further comprises combining the phones of the graphoneme units to form a sequence of phones for the new graphoneme unit.

10. The computer-readable storage medium of claim 7 further comprising identifying a set of graphonemes for each word in a dictionary.

11. The computer-readable storage medium of claim 10 further comprising using the sets of graphonemes identified for the words in the dictionary to train a model.

12. The computer-readable storage medium of claim 11 wherein the model describes the probability of a graphoneme unit appearing in a word.

13. The computer-readable storage medium of claim 12 wherein the probability is based on at least one other graphoneme unit in the word.

14. The computer-readable storage medium of claim 11 further comprising using the model to determine a pronunciation for a word given the spelling of the word.

15. The computer-readable storage medium of claim 7 wherein combining graphoneme units based on the mutual information score comprises summing at least two mutual information scores associated with a new graphoneme unit.

16. A method of segmenting a word into syllables, the method comprising:

a processor segmenting a set of words into phonetic syllables using mutual information scores wherein using a mutual information score comprises computing a mutual information score for two phones by dividing the probability of two phones appearing next to each other in the set of words by the unigram probabilities of each of the two phones appearing in the set of words;

a processor using the segmented set of words to train a syllable n-gram model; and a processor using the syllable n-gram model to segment a phonetic representation of a word into syllables via forced alignment.

17. A method of segmenting a word into morphemes, the method comprising:

a processor segmenting a set of words into morphemes using mutual information scores wherein using mutual information scores comprises computing a mutual information score for two letters based on the probability of the two letters appearing next to each other in the set of words and the unigram probabilities of each of the two letters appearing in the set of words;

a processor using the segmented set of words to train a morpheme n-gram model; and a processor using the morpheme n-gram model to segment a word into morphemes via forced alignment.

* * * * *